Patented Sept. 16, 1930

1,776,029

UNITED STATES PATENT OFFICE

HENRY HOWARD, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE

PROCESS OF MAKING BARIUM SULPHIDE SOLUTIONS

No Drawing. Application filed December 2, 1926. Serial No. 152,304.

The invention relates to a method whereby crude lithopone substantially free from zinc oxide and other zinc compounds soluble in acetic acid may be prepared, and more particularly to a method of producing a barium sulphide solution containing substantially no barium hydroxide in excess of that equivalent to the barium hydrosulphide theoretically assumed to be present in said solution adaptable for use in precipitating zinc oxide-free crude lithopone.

In the manufacture of lithopone it is very desirable to obtain the maximum content of zinc sulphide, and the minimum content of zinc oxide and other acetic acid-soluble zinc compounds usually referred to as zinc oxide, in the finished product, which should correspond as closely as possible to the theoretical formula 70% $BaSO_4$.30% $ZnS$. During the process of manufacture, which process comprises the operations of precipitating the crude lithopone by treating an aqueous solution of barium sulphide with an aqueous solution of zinc sulfate, filtering and drying the crude lithopone, calcining the dried crude lithopone in an atmosphere substantially free from oxygen, quenching the calcined lithopone in an aqueous fluid, and drying and grinding said quenched product in an atmosphere substantially free from oxygen, objectionable zinc compounds soluble in acetic acid, as, for example, zinc oxide, may be formed, and this formation of said objectionable zinc compounds may be traceable to the presence of excess barium hydroxide or similar compounds in the barium sulphide solution used. When barium sulphide, ordinarily produced from heavy spar, and which is to be used in the precipitation of crude lithopone, is allowed to remain in storage for any extended period subsequent to its reduction and prior to its solution, there is a tendency for oxidation to take place, with the formation of some barium oxide. The barium sulphide solution prepared therefrom will contain some barium hydroxide in excess of that theoretically assumed to be formed by the dissociation and hydrolysis of BaS in water, and this said excess barium hydroxide naturally will precipitate its equivalent of zinc oxide or zinc hydroxide.

It is a fact that lithopone manufactures hitherto have considered it commercially impossible to decrease the acetic acid-soluble zinc compounds content of the finished lithopone pigment below about from 3.0% to 0.5% by weight. It has been suggested that the acetic acid-soluble zinc compounds content might be decreased by the addition to the calcined lithopone of sulfates of zinc, cadmium or mercury, or by treating the calcined and quenched lithopone with dilute sulfuric acid or with metallic carbonates, and the like. Such procedures have proven to be disadvantageous.

An object of the present invention is to provide a method for the substantially complete elimination of acetic acid-soluble zinc compounds from the slurry of crude (i. e., uncalcined) lithopone.

The invention is based upon my discovery of the fact that the barium hydroxide in excess of that equivalent to the barium hydrosulphide theoretically assumed to be contained in the barium sulphide solution to be used in precipitating the crude lithopone may be substantially completely eliminated by adding to said barium sulphide solution, prior to its interaction with zinc sulfate solution, its chemical equivalent of barium hydrosulphide, $Ba(SH)_2$, to effect equalibrium with the barium hydroxide in excess of that equivalent to the barium hydrosulphide theoretically assumed to be contained therein. More simply expressed, my invention comprises adding barium hydrosulphide to an aqueous lixiviation product of barium sulphide and barium oxide. It has been found that a crude lithopone obtained by the interaction of aqueous solutions of equimolecular amounts of substantially pure zinc sulfate and of barium sulphide treated as above described will contain no, or only a negligible amount of, zinc oxide.

While, for the purpose of clearness and brevity, the solution containing the barium compound has been, and hereinafter will be, called a barium sulphide solution, it is noted that it is the generally accepted theory that barium sulphide does not exist as such in an aqueous solution and that the solution obtained by lixiviating barium sulphide with water consists in an aqueous solution of barium hydroxide, $Ba(OH)_2$, and barium hydrosulphide, $Ba(SH)_2$.

The amount of barium hydroxide in excess of that equivalent to the barium hydrosulphide theoretically assumed to be present in the barium sulphide solution may be determined by any suitable analytical method, and from the determination there may be calculated that amount of barium hydrosulphide which will be equivalent to said excess barium.

The barium hydrosulphide for use in the above process may be prepared in any suitable manner, but my preferred procedure is to saturate a strong barium sulphide liquor, or a slurry of black ash in water, with hydrogen sulphide gas until all of the barium therein present is converted into barium hydrosulphide. After determination, by a suitable analytical method, of the strength of the barium hydrosulphide solution thus obtained, there may be calculated the quantity of said solution equivalent to any predetermined amount of barium hydroxide in excess of that equivalent to the barium hydrosulphide theoretically assumed to be present in a given lixiviation product of technical barium sulphide.

The solution of barium sulphide thus obtained is added to an equimolecular quantity of substantially pure zinc sulfate in aqueous solution, in the known manner, thereby precipitating a crude lithopone substantially free from zinc oxide.

I claim:

1. Process which comprises adding to an aqueous lixiviation product of barium sulphide and barium oxide, barium hydrosulphide in an amount molecularly equivalent to said barium oxide.

2. Process of reducing the barium hydroxide content from the barium oxide content in the lixiviation product of a crude barium sulphide containing barium oxide, which comprises adding thereto a material amount of barium hydrosulphide.

In testimony whereof, I affix my signature.

HENRY HOWARD.